(12) United States Patent
Ferlitsch

(10) Patent No.: US 8,405,846 B2
(45) Date of Patent: Mar. 26, 2013

(54) SYSTEM AND METHOD FOR MAINTAINING A DEVICE JOB HISTORY

(75) Inventor: Andrew Rodney Ferlitsch, Tigard, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 3468 days.

(21) Appl. No.: 10/659,513

(22) Filed: Sep. 10, 2003

(65) Prior Publication Data

US 2005/0052684 A1 Mar. 10, 2005

(51) Int. Cl.
*G06F 3/12* (2006.01)

(52) U.S. Cl. .................. 358/1.15; 358/1.16; 399/10

(58) Field of Classification Search .................. 717/170; 709/203; 358/1.15; 399/10
See application file for complete search history.

(56) References Cited

U.S. PATENT DOCUMENTS

| | | | |
|---|---|---|---|
| 5,732,275 A * | 3/1998 | Kullick et al. ............. | 717/170 |
| 5,898,823 A * | 4/1999 | Sorkin et al. ............. | 358/1.15 |
| 6,201,611 B1 * | 3/2001 | Carter et al. ............. | 358/1.15 |
| 6,219,151 B1 | 4/2001 | Manglapus et al. ......... | 358/1.15 |
| 6,317,848 B1 | 11/2001 | Sorens et al. ............. | 714/48 |
| 6,452,689 B1 | 9/2002 | Sninivasan ............. | 358/1.15 |
| 6,678,068 B1 * | 1/2004 | Richter et al. ............. | 358/1.15 |
| 2002/0001104 A1 | 1/2002 | Shima ................. | 358/442 |
| 2002/0057449 A1 | 5/2002 | Chapman et al. .......... | 358/1.15 |
| 2002/0059361 A1 * | 5/2002 | Saruwatari ............. | 709/203 |
| 2002/0063880 A1 | 5/2002 | Raney ................. | 358/1.14 |
| 2002/0080389 A1 * | 6/2002 | Carney et al. ............. | 358/1.15 |

\* cited by examiner

*Primary Examiner* — Twyler L Haskins
*Assistant Examiner* — Lennin Rodriguezgonzalez
(74) *Attorney, Agent, or Firm* — Law Office of Gerald Mallszewski; Gerald Mallszewski

(57) ABSTRACT

A system and method are provided for maintaining a device job history. The method comprises: sending jobs to a device for performance; making a record of the jobs; maintaining the job record after the performance of the job; and, filtering the job record to retain a history associated with a client. The job record may be maintained at the device performing the job, on a server managing jobs sent to the device, or with the client sending the job. The client may choose to monitor such processes as device status, job status, or the communications to the device. In one aspect, the method further comprises viewing the filtered job record. Then, a viewable copy of the filtered job record can be accessed from the client, the server, or a web page associated with the device.

33 Claims, 13 Drawing Sheets

Fig. 3 *(PRIOR ART)*
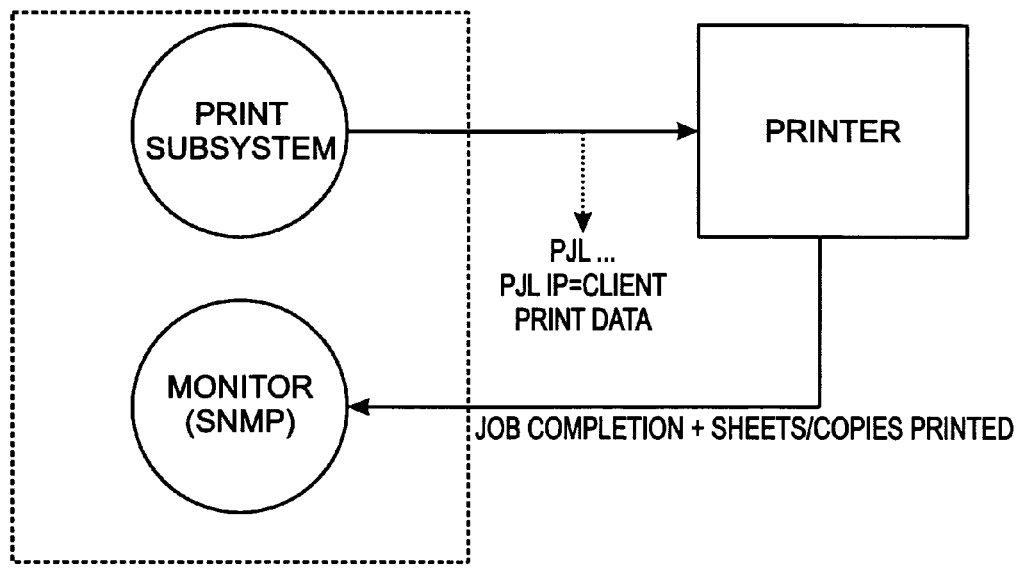
Fig. 4 *(PRIOR ART)*
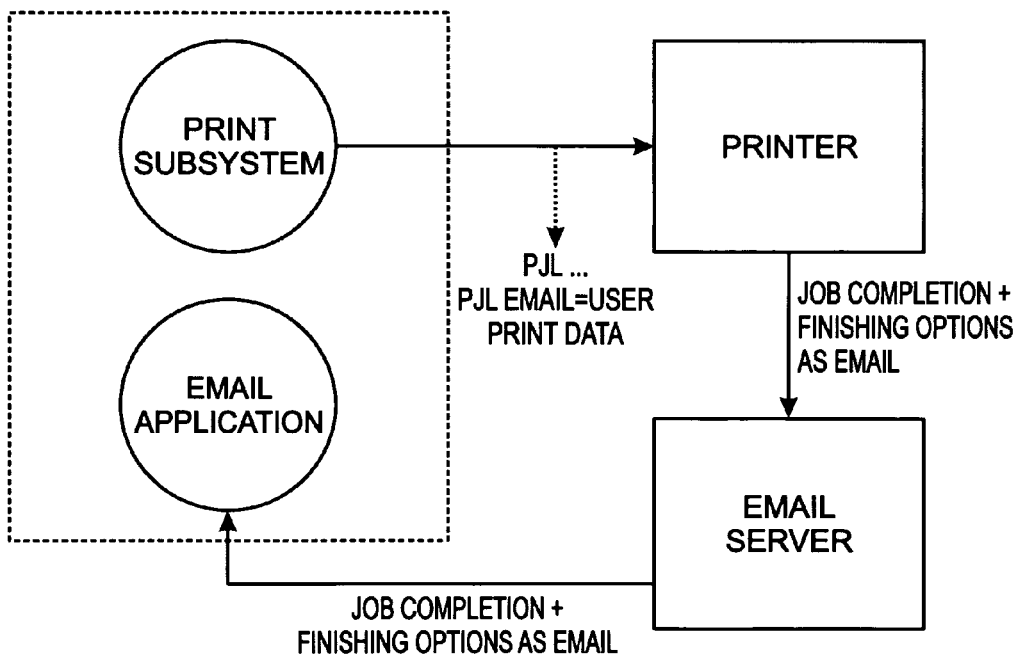

Fig. 7 *(PRIOR ART)*

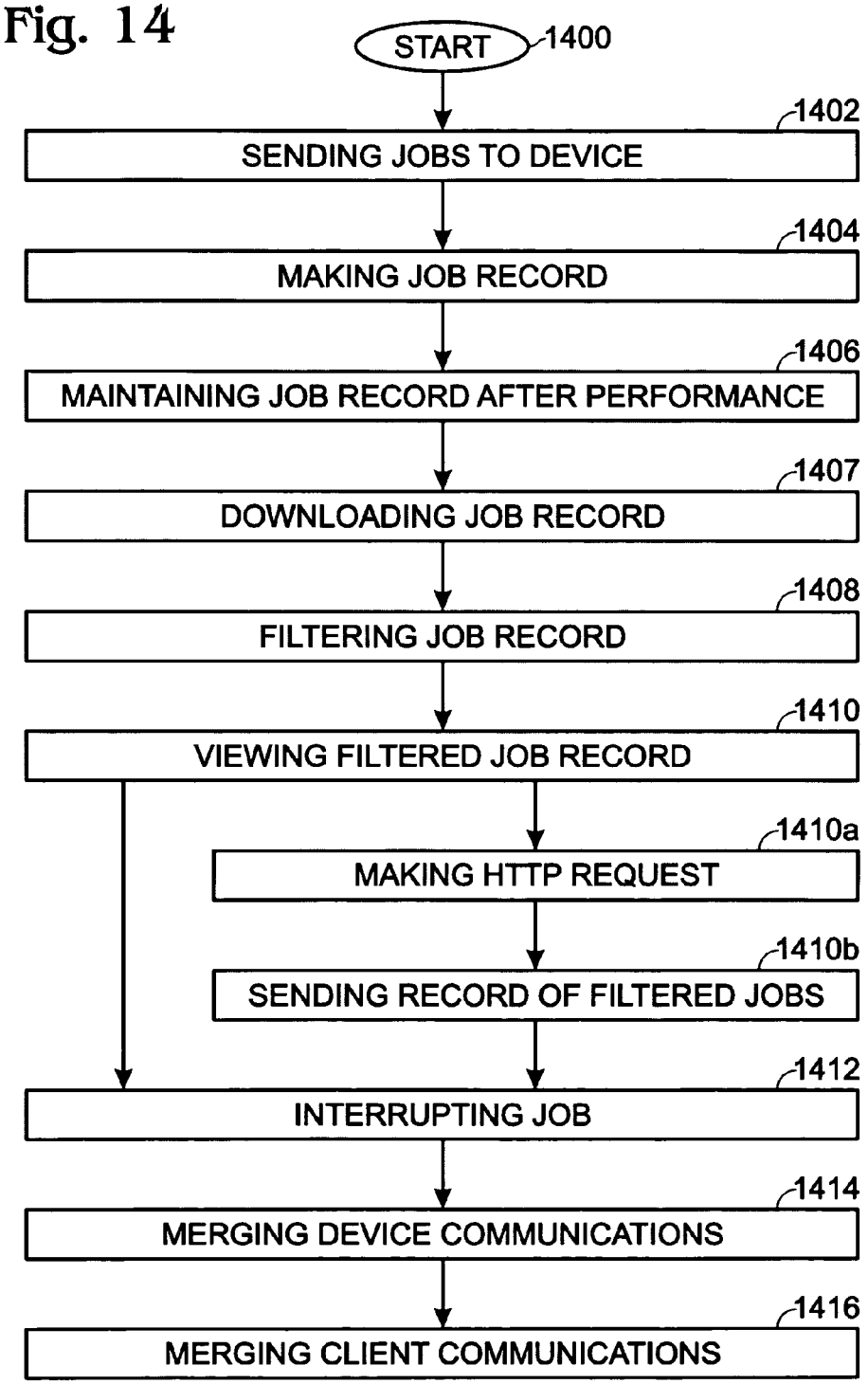

SYSTEM AND METHOD FOR MAINTAINING A DEVICE JOB HISTORY

BACKGROUND OF THE INVENTION

1. Field of the Invention

This invention generally relates to digital image and text processing and, more particularly, to a system and method for maintaining a specific device work history that is accessible to the device's client.

2. Description of the Related Art

When a job is printed from a client computer to a digital imaging device, scanned from a digital imaging device to a client, a fax job sent from/to a digital imaging device, or a document transferred to/from a digital imaging device through a print/scan/fax subsystem, the history of the job is generally not retained after completion. The history may include actions such as job completion, error, and/or restart.

FIG. 1 is a diagram of a conventional print subsystem (prior art). Conventionally, the print subsystem on a computing system, such as illustrated by the Microsoft Windows® family of operating systems, only reports on spooled jobs that have not been completely despooled to a printing device. For example, if a user sends 3 print jobs to a printer, the user might see the following through the local print monitor:

1. $1^{st}$ Job is despooling from client to printer
Job 1 Printing
Job 2 Spooled
Job 3 Spooled
2. $1^{st}$ Job is fully despooled and $2^{nd}$ job is despooling to the printer:
Job 2 Printing
Job 3 Spooled
3. $2^{nd}$ Job is fully despooled and the $3^{rd}$ job is despooling to the printer:
Job 3 Printing The above monitoring system has several problems, such as:

1. If an error occurs after the printer has acknowledged acceptance of a print job, for example, the job is fully raster image processed (RIP'd), internally queued, or on hold queue for manual release, there is no record of the event reported back to the monitor.

2. Once a job is fully despooled by the local and/or network spooler, there is no retained job history. For example, such history could be used to confirm that a lost job was printed (or not), and provide a job location/time.

FIG. 2 is a diagram of a print subsystem with a post-despooling job status monitor (prior art). In the current art, there are several methods for attempting to improve on the print subsystem of FIG. 1. One such method is illustrated by Sharp's Status Monitor SMON®. In this product, the network address of the local client is embedded in the print job, and a monitoring process is run in the background (i.e., asynchronous to the despooling of the print job) on the client machine. When the printer successfully outputs the print job, or detects an error, a job status message is sent back to the monitoring device on the local client machine, using the network address of the client machine.

While this method does allow for the status of the current print job to be reported back to the user throughout the print job lifecycle, including interruption and resumption, until final paper out, this method still suffers in that:

1. The monitor is not integrated with print spooler/subsystem. The current job status as reported by the device is not reflected in the printer monitor.

2. There is no logging and reporting of past job history.

FIG. 3 is a diagram depicting an SNMP trap print subsystem (prior art). U.S. Pat. No. 6,219,151, Network Printing System, assigned to Hitachi Koki Imaging System, discloses an invention where the network address of the local client is embedded in the print job. A monitoring process is run that registers a document specific SNMP trap with the device. When the printer successfully outputs the print job, or detects an error, an SNMP document specific message, indicating the status of the job, is sent back to the monitoring device on the local client machine, using the client's network address.

This method is still deficient in that:

1. The local client must be able to register the SNMP trap with the device.

2. The invention does not disclose a method for integrating the status with the existing print spooler/subsystem for reporting by the printer monitor.

3. The invention does not disclose a method for logging job history.

FIG. 4 is a diagram depicting a printer subsystem relying upon an email communication link (prior art). US published pending patent application 20020057449, Method and Apparatus for Automatically Communicating Returning Status and Information from a Printer using Electronic Mail (email), describes a method where the email address of the user initiating the print job is embedded in the print job. When the printer successfully outputs the print job, or detects an error, an email message is sent back to the user.

This method is still deficient in that:

1. The message is not real-time. The user must poll the email server.

2. Email is not integrated with print spooler/subsystem for reporting by the printer monitor. Print jobs may be deleted by a spooler before they can be reported.

3. The application does not disclose a method for logging job history.

FIG. 5 is a diagram depicting an imaging device storage embodiment (prior art). The method internally logs the completion of imaging jobs, such as print/scan/fax job, in the device's non-volatile storage, such as a hard disk. The user can then view the status of jobs that are queued, printing, or past printed from the device's front panel display. The Sharp AR-350/450 digital imaging devices are examples of this method. This method still suffers in that:

1. No status is available for jobs still in local/network spooler queues, that is, jobs not yet despooled to the device.

2. No access is available to job status/history from a client computing device. A user must directly interface with the device.

3. No job filtering is performed, to provide only the user's specific jobs. That is, all jobs are shown.

FIG. 6 is a diagram depicting a printer subsystem web embodiment (prior art). This device provides the information concerning jobs queued, printing, or past printed on the device, from a device-based web page. The web page provides the user with a means to view this information from the client computing device. This method is still limited for the reasons mentioned above.

FIG. 7 is a diagram depicting a print subsystem port monitor embodiment (prior art). This method maintains a history of jobs despooled from the computing device, to the printer, via the port monitor. In this case, each print job despooled from the client to the printer goes through a port monitor. The port monitor implements the transport and bi-directional communication between the client and printer. The port monitor can then log each job and job status outcome, as determinable. An application could then be used to present the user with a past job history list. The Ricoh Smart Net Monitor is an example of this method.

This method still suffers in that:

1. Job status is dependent on client's concept of job completion. The job status, as known by the device, is not reflected in the port monitor.

2. Jobs that are queued or held in the device appear to be (already) printed.

3. The job history may or may not be merged with local queued jobs.

Although only printer-specific jobs have been mentioned above, other imaging devices, such as a scanner, fax, or document archive/retrieval and transfer devices, can spool and post-process imaging jobs, through a printer or other imaging subsystem. These scan/fax/document jobs also suffer in the same manner of incomplete monitoring and job history. Further, although the job history problem has been described in the context of imaging devices, the problems associated with maintaining and accessing a job history are applicable to a broader class of jobs and job-performing devices.

It would be advantageous if a client could easily access a list of jobs performed on a client-connected device.

It would be advantageous if the above-mentioned accessed job list could automatically be filtered to provide only a client-specific job history.

SUMMARY OF THE INVENTION

In one aspect of the present invention, an imaging device is able to obtain the network address of the client computing device of the print/fax/scan/document job that is currently being printed/scanned/faxed. For example, the network address may be: embedded in the imaging (print) job; extracted from the connection (i.e., sender address); or communicated from the client computing device via another connection. Other means of obtaining the network address are also known to those skilled in the art. It should also be understood that although the invention is often explained in the context of an imaging device, it has broader application.

In one aspect, the imaging device maintains a log of all jobs and their corresponding status. These jobs include (are not limited to): jobs being spooled to the device; jobs being spooled from the device; jobs spooled on the device; jobs pending to the device (push and pull print/fax/scan); jobs in a held state (spooled but waiting for user interaction); jobs being processed on the device; jobs in an interrupt state; jobs canceled; jobs completed with problems; and, jobs completed without problems. The log record may be maintain internally in the device, such as in a hard-disk, or externally, such as in offline storage or server computing device.

Accordingly, a method is provided for maintaining a device job history. The method comprises: sending jobs to a device for performance; making a record of the jobs; maintaining the job record after the performance of the job; and, filtering the job record to retain a history associated with a client.

The job record may be maintained at the device performing the job, on a server managing jobs sent to the device, or with the client sending the job. The client may choose to monitor such processes as device status, job status, or the communications to the device.

In one aspect, the method further comprises viewing the filtered job record. Then, a viewable copy of the filtered job record can be accessed from the client sending the job, the server managing the device jobs, or a web page associated with the device. The access node is dependent, to some extent, upon the location of the job history record.

In one aspect, the job record is maintained on the device performing the job. Then, the method further comprises downloading the job record from the device, to the client. A filtered job record may be downloaded, or the filtering may be performed by the client. In other aspect, the client sends jobs along with a network address, for example, the client's IP address. In this aspect the device maintains the job record and filters the job record by matching the client network address to jobs having the same network address.

Additional details of the above-described method, and a system for selectively maintaining a device job history, are provided below.

BRIEF DESCRIPTION OF THE DRAWINGS

FIG. 3 is a diagram depicting an SNMP trap print subsystem (prior art).

FIG. 4 is a diagram depicting a printer subsystem relying upon an email communication link (prior art).

FIG. 14 is a flowchart illustrating the present invention method for maintaining a device job history.

DETAILED DESCRIPTION OF THE PREFERRED EMBODIMENTS

Figure 1:
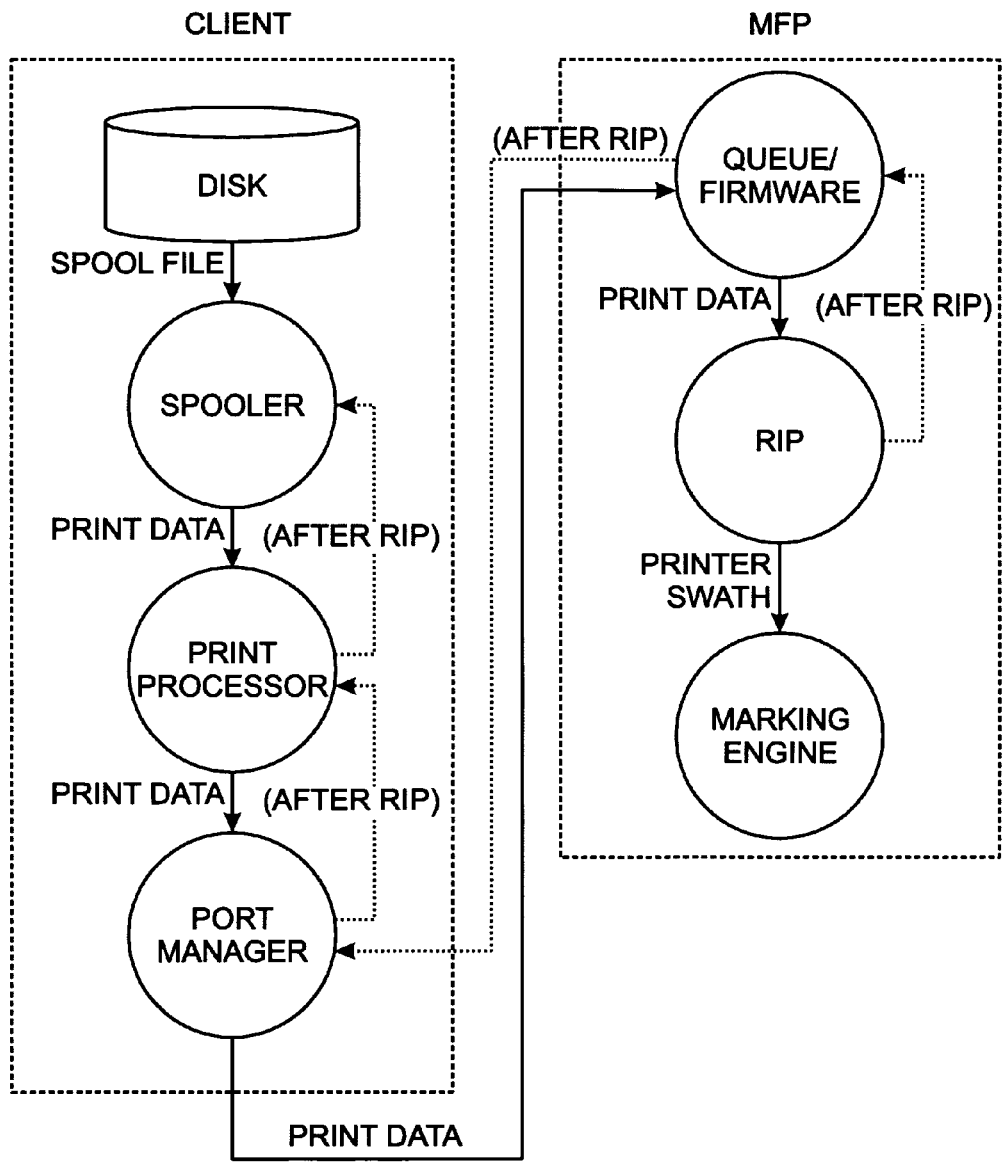
FIG. 1 is a diagram of a conventional print subsystem (prior art).
Figure 2:
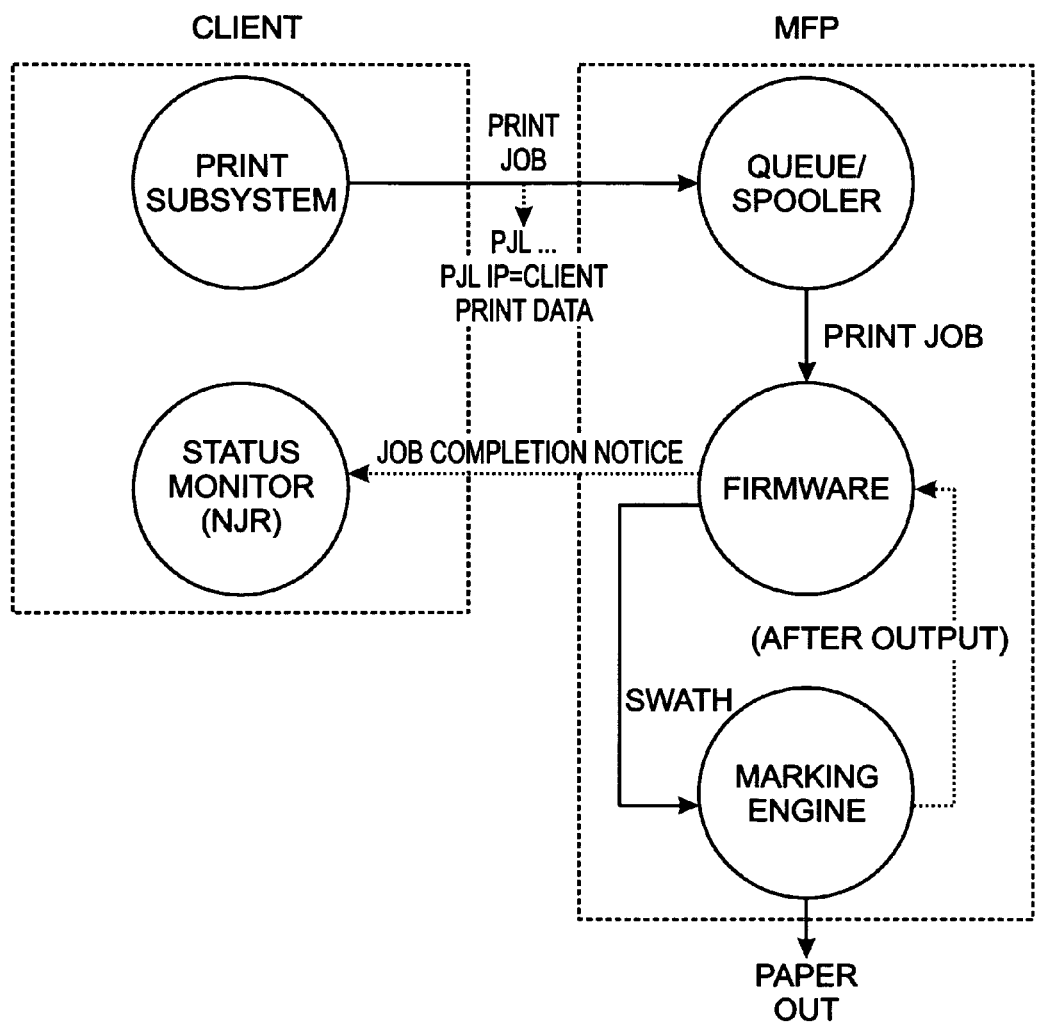
FIG. 2 is a diagram of a print subsystem with a post-despooling job status monitor (prior art).
Figure 5:
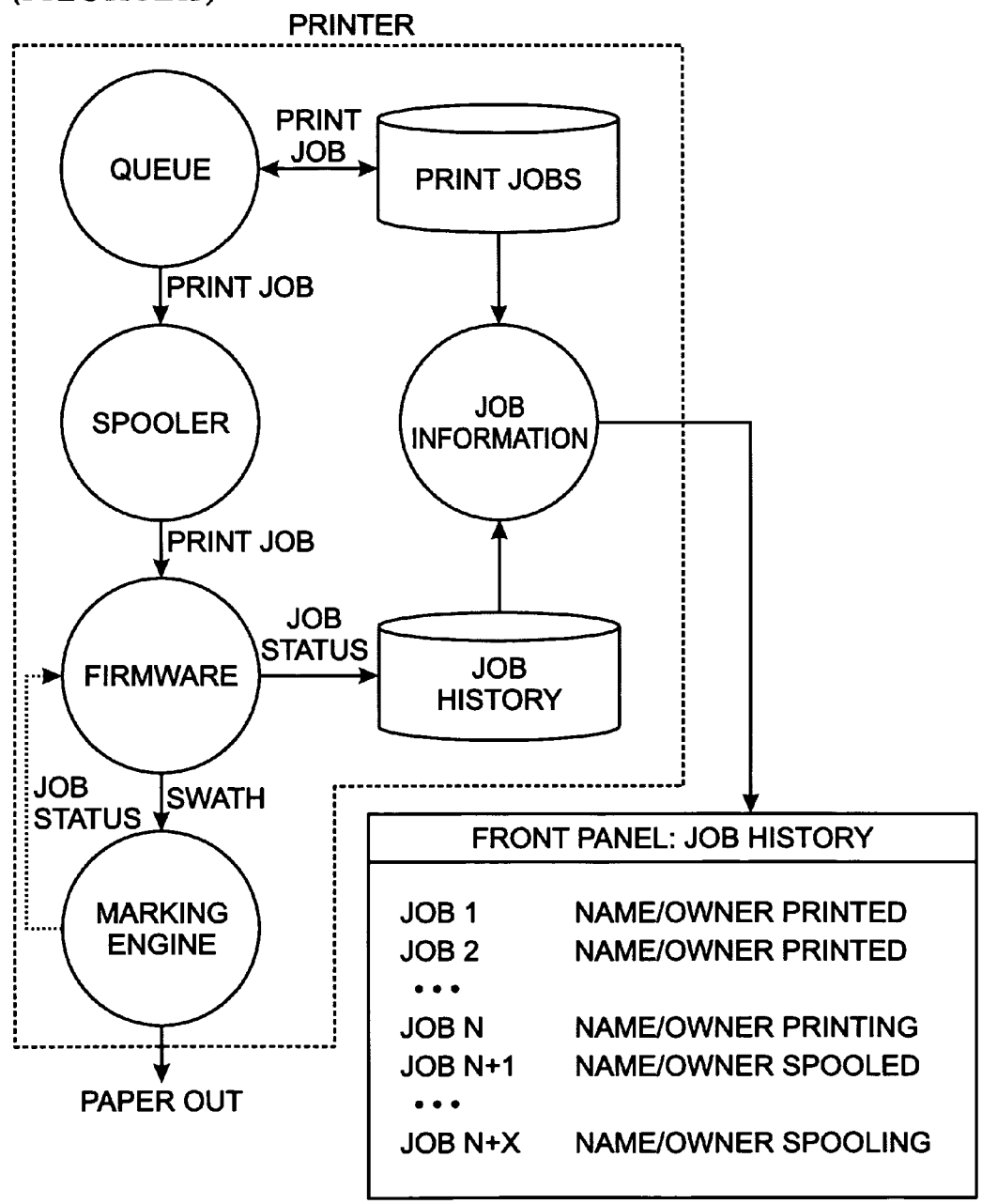
FIG. 5 is a diagram depicting an imaging device storage embodiment (prior art).
Figure 6:
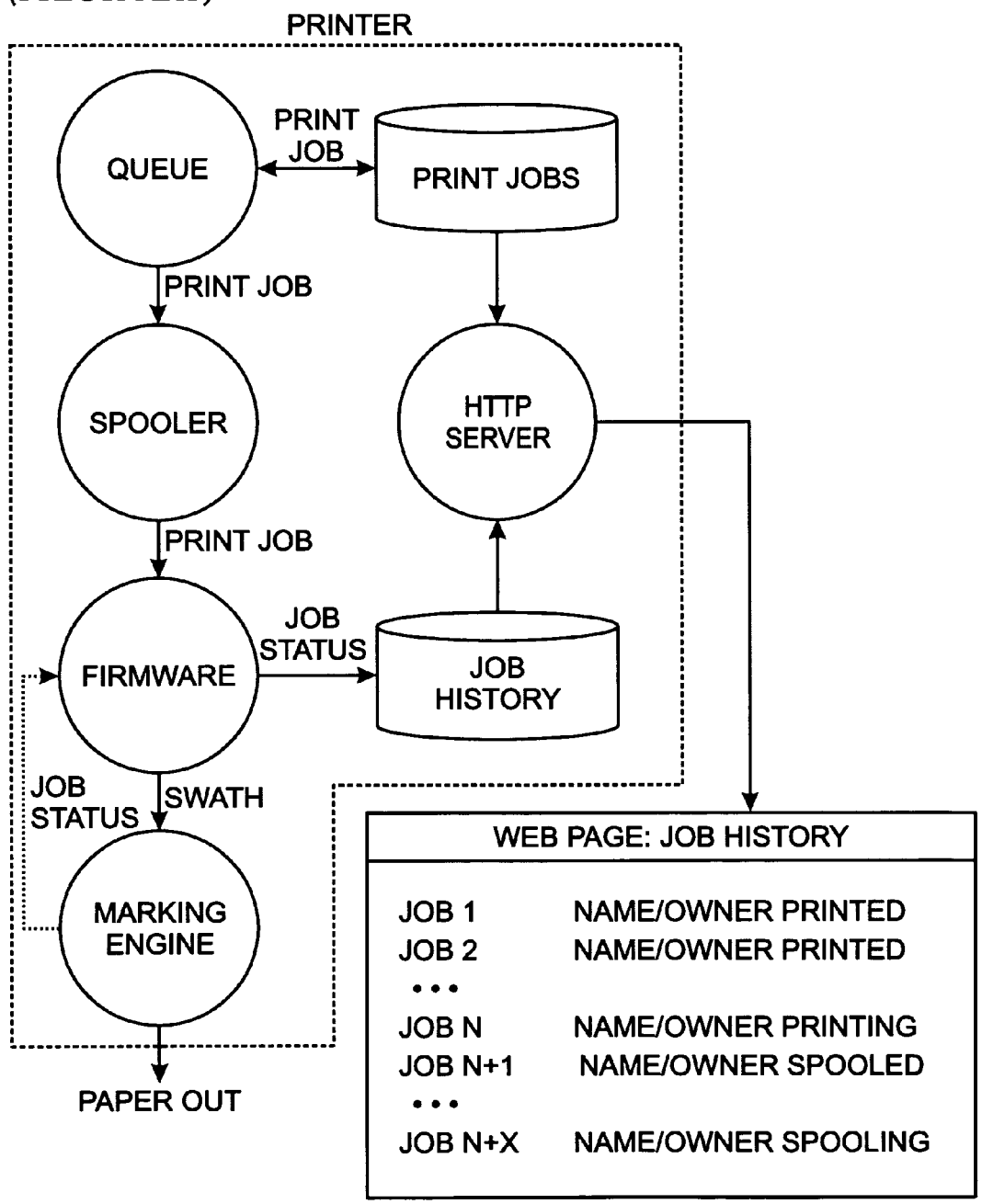
FIG. 6 is a diagram depicting a printer subsystem web embodiment (prior art).
Figure 7:
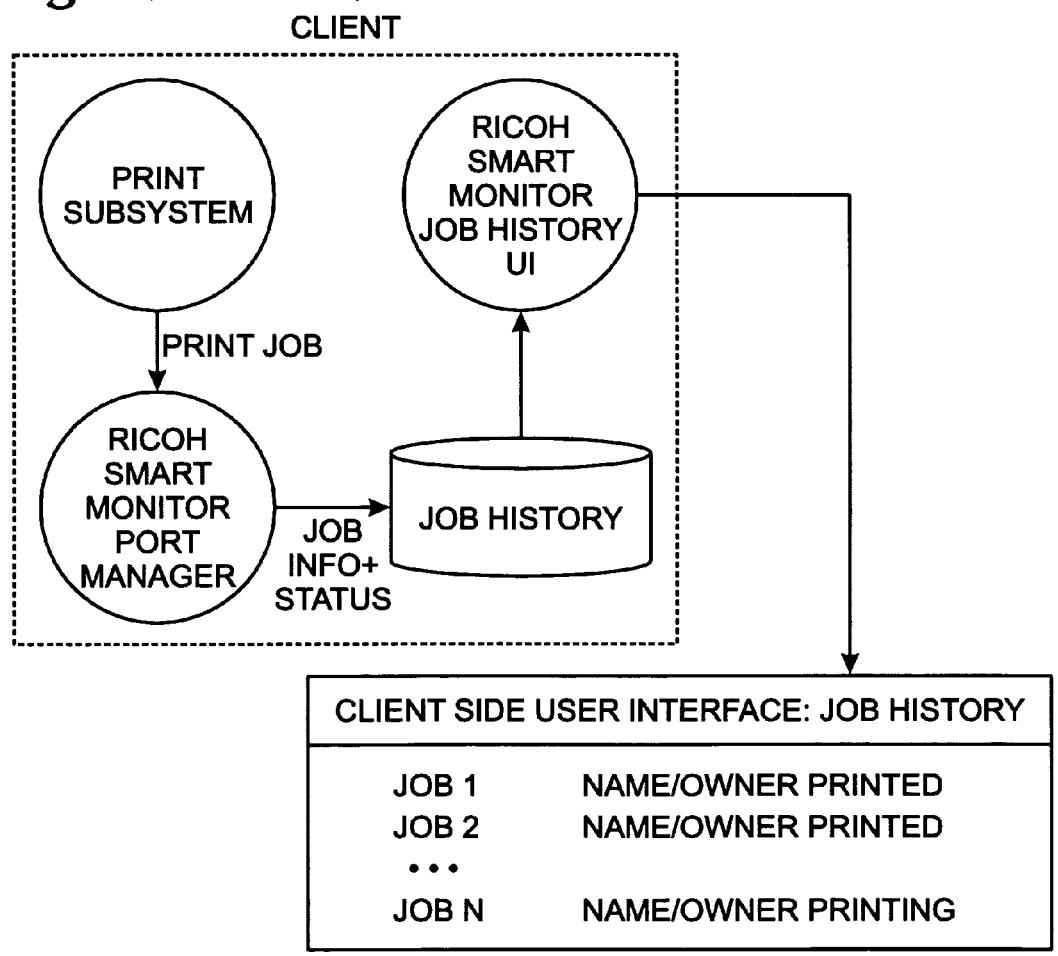
FIG. 7 is a diagram depicting a print subsystem port monitor embodiment (prior art).
Figure 8:
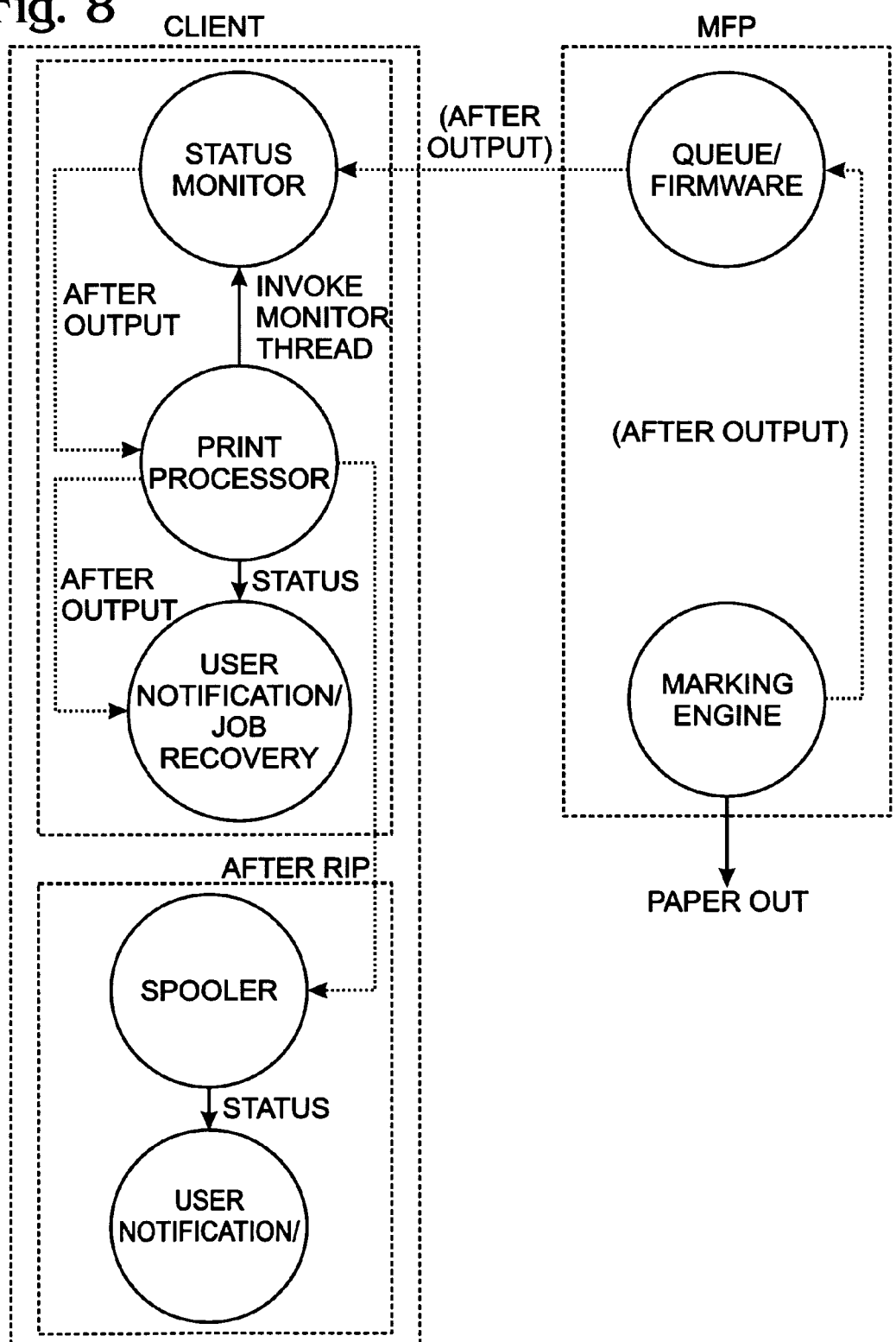
FIG. 8 is a diagram depicting a variation of the print subsystem with post-despooling job status monitor.

FIG. 8 is a diagram depicting a variation of the print subsystem with post-despooling job status monitor. This method incorporates the status monitoring of a job completion notice, such as the one described above for Sharp Status Monitor®, into the print processor. This method has the advantage of extending the job status reporting as 'Printing' in the printer monitor, until the print job is fully outputted by the printer. This method still has a disadvantage in that it does not disclose a method for logging job history.

Figure 9:
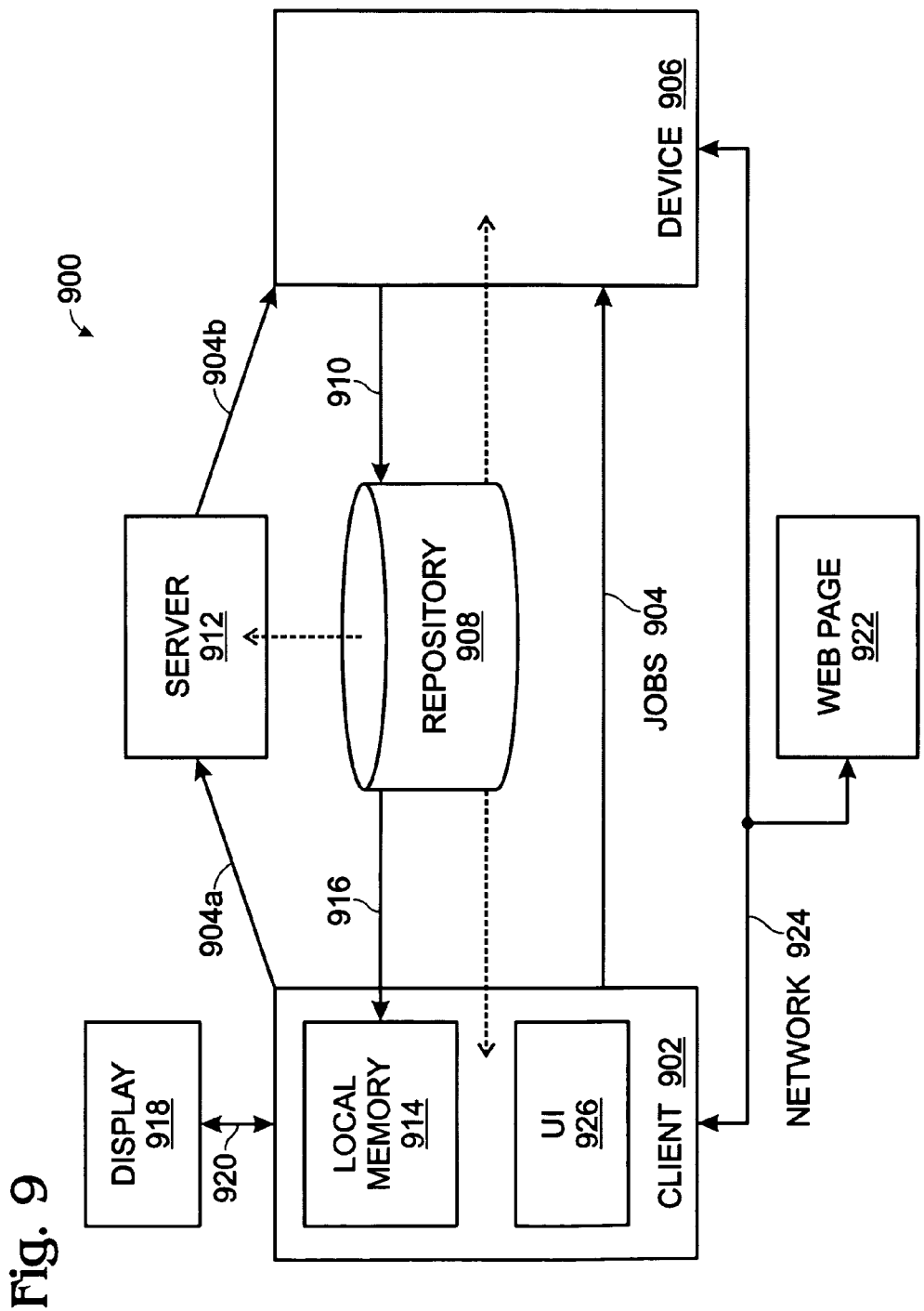
FIG. 9 is a schematic block diagram illustrating the present invention system for selectively maintaining a device job history.

FIG. 9 is a schematic block diagram illustrating the present invention system for selectively maintaining a device job history. The system 900 comprises a client 902, or client computing device, having an interface on line 904 for sending jobs. A device 906 has an interface on line 904 to accept jobs. The device 906 performs the jobs for the client. A repository 908 has an interface on line 910 to accept a record of the jobs performed by the device 906. The repository 908 maintains the job record after the performance of the job, and filters the job record to create filtered history of jobs associated with the client. Note, the fact that the repository 908 maintains a record of already performed jobs does not necessarily mean that pending jobs, or currently performing jobs are not stored.

Some aspects of the system 900 include a server 912 having interfaces 904a and 904b respectively connected to the client 902 and the device 906. The server 912 may be used when the client 902 and device 906 are not locally connected. The server 912 may be used to manage jobs sent to the device 906 by the client 902. The repository 908 can reside with the client 902, the device 906, or with the server 912 in different aspects of the invention (as indicated by the dotted lines). Note that although only a single client (902) is shown, the device 906 may be connected to a plurality of clients. Likewise, although only a single device (906) is shown, the client 902 may be connected to a plurality of devices, either locally, networked through the server 912 or through other servers (not shown).

In one aspect of the system 900, the repository 908 resides at least partially with the device 906, and the system 900 further comprises a local memory 914 residing with the client 902, having an interface on line 916 to accept a download of the job record from the device repository 908. In one variation, the local memory 914 receives a filtered (prefiltered) job history. In another variation, the client 902 receives a complete history of the jobs performed by the device 906, including jobs performed for other clients, and filters this record to obtain a client-specific job record. As explained below, the network address can be used to filter the client's jobs from the overall list of jobs. In this case, the stored job record is cross-referenced to client addresses. In this aspect, the repository function is shared between the so-called repository 908 residing with the device 906 and the local memory 914 residing with the client. That is, repository 908 holds the unfiltered job record and the local memory 914 acts as a repository to hold the filtered job record. Additionally, the client 902 may collect a record of device and/or client communications, and merge these communications with the filtered job record in the local memory 914.

The repository's residence, with respect to the other system elements, can be described by local, remote, or network connectivity. As used herein, an element is locally connected if it resides with the interfacing unit. If locally connected, applications associated with the repository 908 may reside in the same process as the client (inter-process communication) 902, or within another process as the client (intra-process communication). Network connectivity is relatively well-defined connectivity in a network, such as a local area network LAN. Remote connectivity is a relatively undefined form of network connection, perhaps involving an interface across more than one network.

In one aspect of the system, the repository 908 resides with the client 902. The client 902 monitors processes such as the device status, job status, and/or communications to the device. The client 902 is not limited to monitoring any particular type of information or messaging protocol.

A display 918 has an interface on line 920 for accessing a viewable copy of the filtered job record. As shown, the display 918 is connected to the client 902. However, the display 918 need not necessarily be connected to the job-sending client 902. For example, the display 918 could be connected to a second client (not shown) that may, or may not be connected to the device 906. In another alternative (not shown), the display 918 can be connected to the device 906, for example, as a device front panel display. The display 918 accesses a viewable copy of the filtered job obtained from either the client 902, or the server 912 managing the device 906 jobs.

Alternately, the system 900 further comprises a web page 922 having an interface 924, where line 924 represents a network such as a local area network (LAN), to receive job history downloads from the repository 908, assuming the repository 908 resides with the device 906. Then, the display 918 accesses a viewable copy of the filtered job from the web page 922. Note, in this aspect the display 918 need not be associated with the job-sending client 902, even if the job history relates to jobs being performed for the job-sending client 902. More specifically, the client 902 (or another client not shown) makes an HTTP request to the web page 922 associated with the device 906. In response to the request, the repository 908 sends a record of filtered jobs from the device 906, to the web page 922 for client access.

In another aspect of the system 900, the client 902 has a user interface (UI) 926 for interrupting a job sent to the device 906. For example, the user interface 926 can be used to cancel a job, continue a job, or modify a job.

In one aspect, the client 902 sends jobs to the device 906 along with a client network address. If the repository 908 resides with the device 906, it filters the job record by matching the client network address to jobs having the same network address. The client's network address can be embedded in transport layer transmission packets, or with the job in data layer communications. In another aspect, the network address is the client's Internet Protocol (IP) address.

As noted above, in one exemplary version of system 900, the device 906 may be an imaging device such as a printer, copier, fax machine, MFP, scanner, electronic whiteboard, or document server. In this context, the client 902 is a computer that constructs and (locally) despools an imaging job to either an imaging device or server. When the client 902 accepts filtered job history downloads from a repository 908 residing with device 906, the client 902 may monitor imaging device-specific status, job status, or communications to the device. More specifically, the processes and communications being monitored may include the status of job raster image processing (RIP); the status of jobs queued on the image processing device 906; the status of jobs after they have been despooled from either a local spooler (associated with the client 902) or a server 912 (network) spooler; the status of jobs that have been completed by the imaging device 906; and/or, the status of jobs spooled at either the local or server spoolers.

Functional Description

In one aspect of the invention, the job history is maintained in the device and displayed by a device-based web page, where, for each job history/status stored in the device, the IP address of the sender is saved with the job record. When a HTTP request is made for the device-based job history web page, the page is dynamically created (e.g., ASP) where only the job history for jobs whose IP address match the IP address of the requestor are displayed. In this case, the assumption is that the requestor uses the same PC to obtain job history information as was used for sending the job. This way, the device constructs a job history that is specific to the client that is requesting the job history.

In another aspect, the job history is maintained in the device and displayed by a client-side application, where the client-side application downloads the entire job history from the device. The client-side application uses the client's IP address to match (filter) the job history download for jobs generated by that client. The client-specific job history list is merged with job information from the local spooler of jobs generated by the client that are still queued on the local spooler. The client-specific job history list is merged with job information from the network spooler, for jobs generated by the client that are still queued on the network spooler.

In another aspect of the system, the job history is maintained by a status monitoring process on the client and displayed by a client-side application, where the status monitor is able to monitor completion of a job through communication with the spooler and device. Other processes that can be monitored include job completion/status after the job has been RIP'd on the printing device; job completion/status after a job has been despooled from a print server; job completion/status after a job has been despooled for rasterization from an print queue that is internal to the printing device; or, job completion/status after a job has been outputted on the printing device.

The job information and status can be logged by the status monitoring process on the client, where a client-side application displays the client-specific job history. The client-specific job history list can be merged with job information from the local spooler of jobs generated by the client that are still queued on the local spooler. The client-specific job history list can be merged with job information from, the network spooler, for jobs are still queued on the network spooler.

In another variation, the device communicates job interrupts with a client-side status monitoring, where the client-side status monitoring displays the interrupt message to the user. Then, the user can: cancel a print job, continue the print job, or modify the print job. The action selected by the user is then sent back by the status monitoring process to the device. The system monitoring and display of job history is also applicable to scan, fax, and document jobs.

The invention is not dependent upon how the imaging job is initiated. For example, a print job may be initiated by an application using a printer driver, which spools a print job to the print spooler. The invention is independent of the method that a device and/or client uses to dynamically constructs a web page. The invention is independent of the means and form used to log a job history to non-volatile storage and the location of the storage. For example, the job history may be represented as a binary formatted record, one per job notification that is stored on a hard drive. The hard drive may be located internal or external to the imaging device. The invention is independent of the protocol used, between the client and imaging device, to obtain the job completion status. For example, the protocol may be a proprietary protocol over TCP/IP. The invention may be described in terms of Sharp's proprietary NJR (notify job return) protocol over TCP/IP, but is not limited to the NJR protocol.

The invention is independent of the means used by the printing device, and/or client to obtain the network communication (e.g., network) address of the other device to establish the communication channel or identify the client source of the imaging task. For example, the IP address of the client may be embedded in the print job. Generally, as noted above, a print job and printing devices are used to illustrate the invention, but the invention is not limited to only this aspect.

Job History from Device Based Web Page Using Extracted Client Network Address

Figure 10:
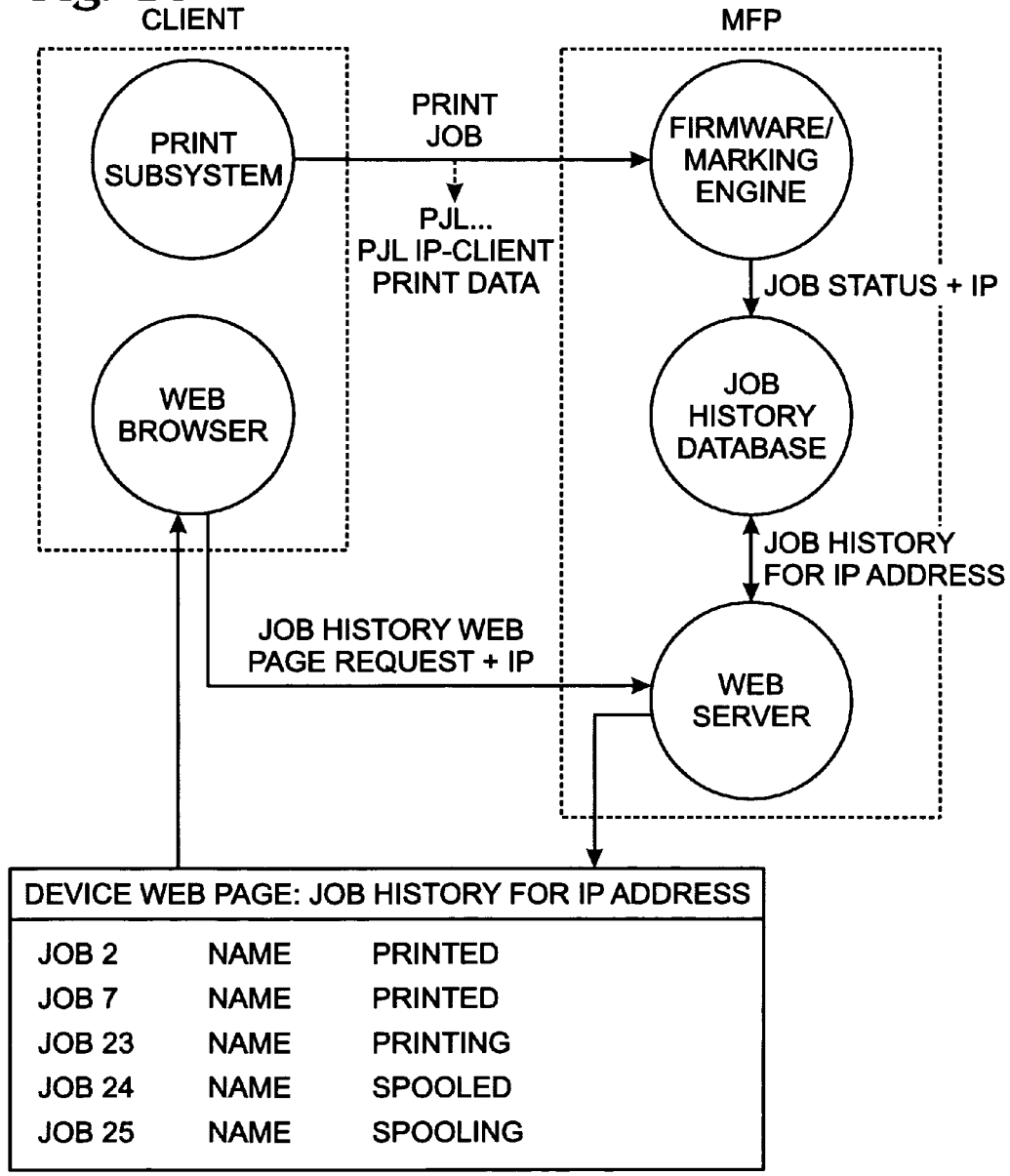
FIG. 10 is a diagram depicting the web page aspect of the present invention job history system.

FIG. 10 is a diagram depicting the web page aspect of the present invention job history system. In this aspect, the imaging device is able to obtain the network address of the client of the current print/fax/scan/document job. For example, the network address may be: embedded in the imaging (print) job; extracted from the connection (i.e., sender address); and/or communicated from the client via another connection. Other means of determining the address are possible.

In one variation, the imaging device maintains a log of all received jobs and their corresponding status. These jobs may include:

1. Jobs being spooled to the device (e.g., print/fax/document).
2. Jobs being spooled from the device (e.g., scan/fax/document).
3. Jobs spooled on the device (e.g., in queue).
4. Jobs pending to device (e.g., interactive pull print/fax from server/client).
5. Jobs in a held state (e.g., spooled but waiting for user interaction).
6. Jobs being processed on the device (e.g., printing/faxing/scanning).
7. Jobs in an interrupt state (e.g., out of paper, user intervention required).
8. Jobs canceled (e.g., user/device cancellation).
9. Jobs completed with problems (e.g., simplex output on a requested duplex job).
10. Jobs completed without problems (e.g., imaged as requested).

The log record may be maintained internal in the device, such as in a hard-disk or externally, such as in offline storage or server computing device.

In this aspect, the device is associated with a HTTP server and has the capability of constructing and transmitting a web page that represents the current and past jobs, and their corresponding job status, also referred to herein as the job history, or job record. The job history may be constructed from the imaging device's internal job log (as stated above), or from spoolers associated with the imaging device. Note, the job may also be constructed from other, unnamed, sources.

In this aspect, the user makes a HTTP request to the imaging device for the device's job history web page. The imaging device extracts the client's network address from the HTTP request. The imaging device then uses the client's network address to identify jobs from the job history that originated from the same client's network address. The client's network address may be extracted by any means, such as, but not limited to: the IP address source address of the HTTP packet, an IP address, or multiple IP addresses, embedded as a field in the HTTP request.

The imaging device then dynamically constructs a job history web page containing only jobs that are associated with the client's network address(es), and returns the created web page to the client.

Figure 11:
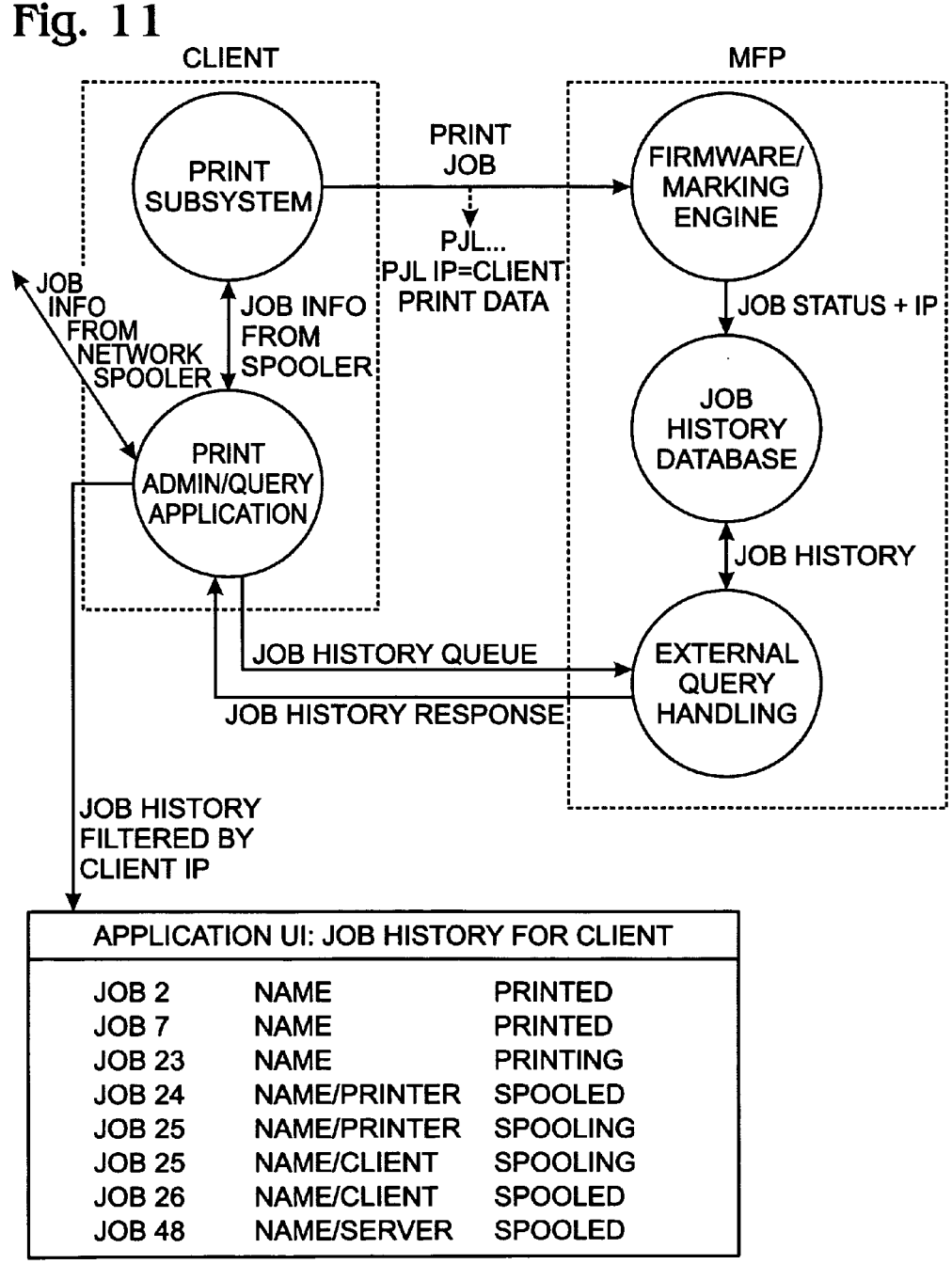
FIG. 11 is a diagram depicting a client dialog aspect of the present invention.
Figure 12:
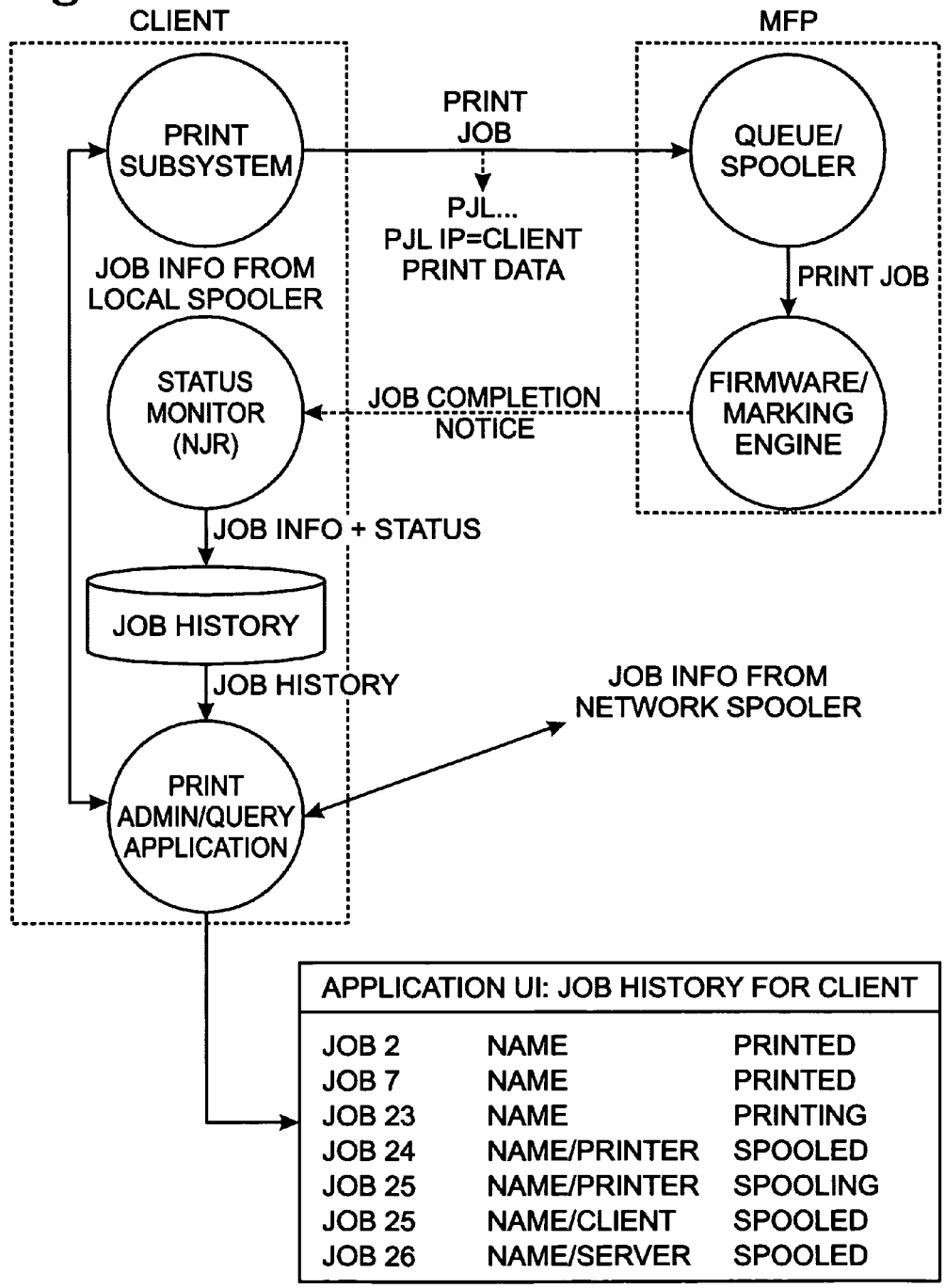
FIG. 12 is a diagram depicting a status monitoring aspect of the present invention.

Job History from Client Based Dialog Using Job History from Imaging Device and Using Client Network Address FIG. 11 is a diagram depicting a client dialog aspect of the present invention. In this aspect, the client requests the job history from the imaging device. The imaging device returns the entire job history. The request and response may be by any protocol, but not limited to: HTTP, SNMP, or proprietary protocol, such as Sharp's NJR. In this aspect, the job history contains the network address of the originating source. The client-side process that sends the request and receives the response may include processes such as: an application, a system process, or a process integrated with the imaging subsystem (e.g., print monitor). The client then uses the client's network address to identify jobs from the job history that originated from the client's network address. The client may also obtain job information about imaging jobs that are spooled on the client (i.e., local spooler) and/or jobs that are spooled on a server (i.e., network spooler). The client then dynamically constructs a job history, a dialog or web page for example, containing only jobs that are associated with the client's network address and displays the created dialog or web page to the client. The request and/or response may be additionally secured, such as by encryption by either the transport or data layer, or both.

Job History from Client Based Status Monitor Using Job Completion Notifications from Imaging Device FIG. 12 is a diagram depicting a status monitoring aspect of the present invention. In this aspect, the client receives job completion notifications from the imaging device. The job completion notifications may be made by any above-described prior art means, but is not necessarily limited to just those means. As the imaging job is processed, the imaging device sends at least one completion response back to the network address of the client. The response or connection means has an identifier enabling the client to direct the response to the appropriate process listening for the response. This identifier may include, but is not limited to: port (e.g., socket port); file or directory; FTP address; SNMP trap; or email address.

A job completion notice may be sent for any of the following events, including:

1. Jobs being spooled to the device (e.g., print/fax/document).
2. Jobs being spooled from the device (e.g., scan/fax/document).
3. Jobs spooled on the device (e.g., in queue).
4. Jobs pending to device (e.g., interactive pull print/fax from server/client).
5. Jobs in a held state (e.g., spooled but waiting for user interaction).
6. Jobs being processed on the device (e.g., printing/faxing/scanning).
7. Jobs in an interrupt state (e.g., out of paper, user intervention required).
8. Jobs canceled (e.g., user/device cancellation).
9. Jobs completed with problems (e.g., simplex output on a requested duplex job).
10. Jobs completed without problems (e.g., imaged as requested).

The job completion notice, such as in response to a print job, may also be sent on a per sub-job event basis, including:

1. When the RIP process begins
2. When the RIP process ends
3. When each page is RIP'd
4. When each page is outputted
5. When an error is recovered Each response may also contain additional information, including: imaging options; action taken to recover job; date & time; or, consumables used.

A status monitoring process on the client receives the job completion notifications and logs the notification. The log entry may contain all or some of the information contained in the job completion notification, and may contain additional information that was not part of the job completion notification. The log may be stored internally, such as in a hard-disk, or externally, such as in offline storage. Other storage means may also be used. The number of log entries or storage size may be unlimited (i.e., virtual) or of a fixed number or size.

A process on the client reads the job history log and constructs a dialog or web page (to name a few examples). The process may be any type of process, such as, but not limited to, an application, system process, or a process integrated with the imaging subsystem (e.g., print monitor). The client process may also obtain job information about imaging jobs that are spooled on the client (i.e., local spooler) and/or jobs that are spooled on a server (i.e., network spooler). The client process then displays the created dialog or web page. The job completion notification response may also be additionally secured, such as by encryption, on either the transport or data layer, or both.

Interactive Job Control with Imaging Device via Status Monitor

Figure 13:
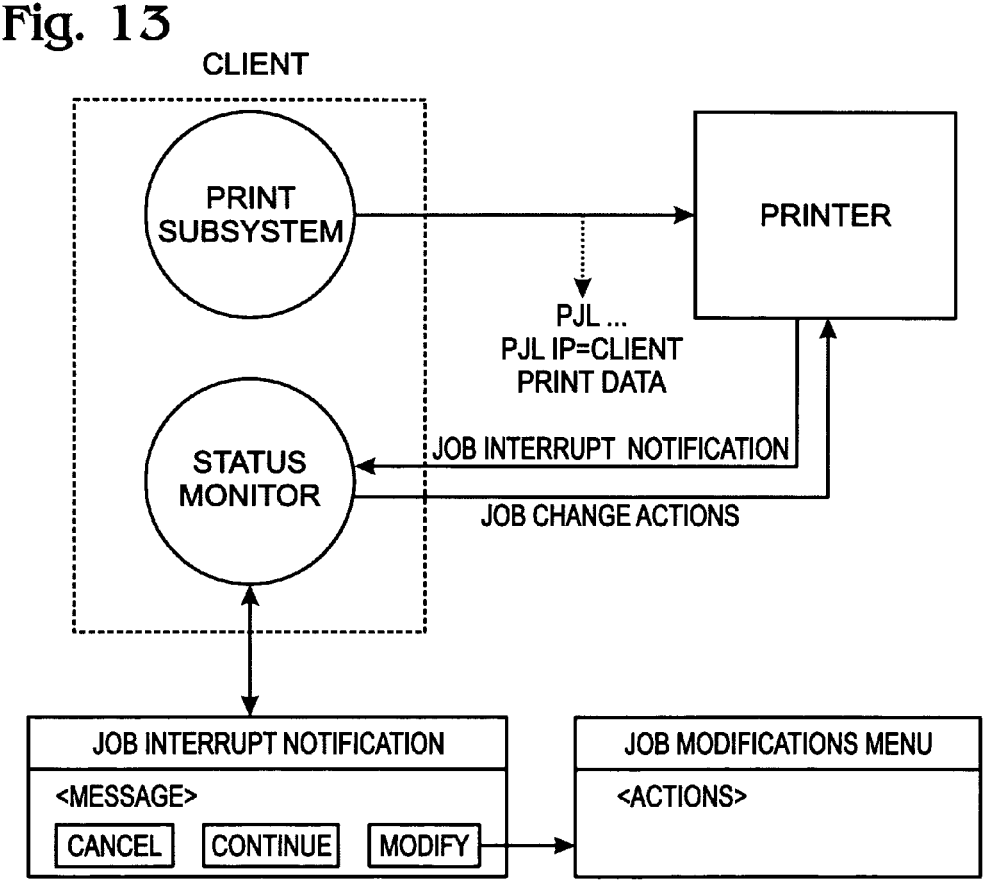
FIG. 13 is a diagram depicting an interactive control aspect of the present invention.

FIG. 13 is a diagram depicting an interactive control aspect of the present invention. In this aspect, the client has the capability of interactive control with an imaging device, in response to the client receiving a job completion notice from the imaging device. The means and type of job completion notice may be of any of the means and types described earlier, however, additional means are possible. The interactive means may be a part of the status monitor or a separate process that obtains information from the status monitor, such as by the job history log.

In this case, the imaging device and client have a bi-directional communication capability. When the imaging device encounters an event that may need user intervention, a job interrupt notice is sent to the client. These events may include: an error condition, such as a paper jam; out of a resource, such as paper or a paper size; a low resource, such as toner; or, lack of a capability, such as stapling.

In this aspect, the imaging device waits for a response from the client after sending a job interrupt notification. The response can be sent by any means, including: a response to a HTTP web page; email message; SNMP; or, proprietary protocol. The imaging device may wait indefinitely, timeout, or discontinue the wait based on another event or response, such as a front panel action. The response from the client may include: cancel; resume; or, modify the job.

FIG. 14 is a flowchart illustrating the present invention method for maintaining a device job history. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 1400.

Step 1402 sends jobs to a device for performance. Step 1404 makes a record of the jobs. Step 1406 maintains the job record after the performance of the job. Step 1406 maintains the job record at the device performing the job, a server managing jobs sent to the device, or the client sending the job. Step 1408 filters the job record to retain a history associated with a client. Step 1410 views the filtered job record.

When the job record is maintained on the client, Step 1406 may additionally include the client monitoring processes such as the device status, job status, and communications to the device. These processes have been described in detail above. However, the method is not limited to the monitoring of any particular processes.

Viewing the filtered job record in Step 1410 includes accessing a viewable copy of the filtered job record obtained from the client sending the job, the server managing the device jobs, or a web page associated with the device. However, it would be possible to access a viewable copy of the filtered job record from other nodes.

When Step 1406 maintains the job record on the device performing the job, the method may include an additional step, Step 1407. Step 1407 downloads the job record from the device, to the client. In some aspects, Step 1407 downloads a filtered job record. Alternately, Step 1407 downloads an unfiltered job record. Then, filtering the job record to retain a history associated with a client in Step 1408 includes filtering the job record downloaded to the client. Note, in this aspect the unfiltered job record is cross-referenced to client addresses.

In another aspect of the method a further step, Step 1412, interrupts a job with an action selected from the group including canceling a job, continuing a job, and/or modifying a job.

In one aspect, Step 1402 sending jobs to a device for performance along with a network address associated with the client sending the jobs. Then, maintaining the job record after the performance of the job (Step 1406) includes maintaining the job record on the device performing the job, and Step 1408 filters the job record by matching the client network address to jobs having the same network address. The network address can be embedded in transport layer transmission packets, embedded with the job in data layer communications, or transmitted by other communication means. For example, the network address may be an IP address. In some aspects, a further step, Step 1414 merges device communications with the filtered job record. Step 1416 may merge client communications with the filtered job record. For example, Step 1416 may merge information gleaned from a spooler or server with the filtered job record. In one aspect, viewing the filtered job record in Step 1410 includes substeps. Step 1410a makes an HTTP request, by the client, to a web page associated with the device. Step 1410b sends a record of filtered jobs from the device, to the web page.

As noted above, the present invention may be understood in the context of print jobs. In this context, sending jobs to a device for performance in Step 1402 includes sending image processing jobs to an imaging device such as a printer, copier, fax machine, MFP, scanner, electronic whiteboard, or document server. Then, a client monitoring device status, job status, or device communication process (Step 1406) may include: monitoring the status of job RIP; monitoring the status of jobs queued on the image processing device; monitoring the status of jobs after they have been despooled from either a local or network spooler; monitoring the status of jobs that have been completed by the imaging device; or, monitoring the status of jobs spooled at a node at either a local or network spooler. If an image processing job is interrupted (Step 1412), then the monitoring of Step 1406 may includes monitoring the status of the interrupted job.

A system and method have been provided for maintaining, monitoring, and accessing a filtered job record, where the record is filtered to track jobs associated with a specific client and/or a specific job-performing device. Embodiments of the invention may be enabled in the spooling and despooling subsystems of the Microsoft Windows family of Operating Systems, Apple MacIntosh Operating System, Linux Operating System, System V Unix Operating Systems, BSD Unix Operating Systems, OSF Unix Operating Systems, Sun Solaris Operating Systems, HP/UX Operating Systems, IBM Mainframe MVS Operating System, or IBM AS/400 Operating System. Other variations and embodiments of the invention will occur to those skilled in the art.

I claim:

1. A method for maintaining a device job history on an imaging device, the method comprising:
   sending jobs, along with a network address associated with a client sending the jobs, to an imaging device for printing;
   making a record of the jobs;
   maintaining the job record in the imaging device, after the performance of the jobs on the imaging device printing the job; and,
   filtering the job record to retain a history associated with a client by matching the client network address to jobs having the same network address.

2. The method of claim 1 wherein maintaining the job record includes the imaging device monitoring processes selected from the group including the device status, job status, and communications to the device.

3. The method of claim 2 wherein sending jobs to the imaging device for printing includes sending image processing jobs to an imaging device selected from the group including printers, copiers, fax machines, multifunctional peripheral (MFP) devices, scanners, electronic whiteboards, and document servers.

4. The method of claim 2 wherein monitoring processes selected from the group including the device status, job status, and communications to the device includes:
   monitoring the status of job raster image processing (RIP);
   monitoring the status of jobs queued on the image processing device;
   monitoring the status of jobs after they have been despooled from a node selected from the group including local and network spoolers;
   monitoring the status of jobs that have been completed by the imaging device; and,
   monitoring the status of jobs spooled at a node selected from the group including local and network spoolers.

5. The method of claim 4 further comprising:
   interrupting an image processing job with a action selected from the group including canceling a job, continuing a job, and modifying a job; and,
   wherein monitoring processes selected from the group including the device status, job status, and communications to the imaging device includes monitoring the status of the interrupted job.

6. The method of claim 1 further comprising:
   viewing the filtered job record.

7. The method of claim 6 wherein viewing the filtered job record includes accessing a viewable copy of the filtered job record obtained from a node selected from the group including the client sending the job, the server managing the device jobs, and a web page associated with the imaging device.

8. The method of claim 1 further comprising:
   downloading the filtered job record from the imaging device, to the client.

9. The method of claim 6 further comprising:
   interrupting a job with an action selected from the group including canceling a job, continuing a job, and modifying a job.

10. The method of claim 1 wherein sending jobs along with a network address includes using a network address selected from the group including a network address embedded in transport layer transmission packets and a network address embedded with the job in data layer communications.

11. The method of claim 1 wherein sending jobs along with a network address includes using the client's Internet Protocol (IP) address.

12. The method of claim 1 further comprising:
   viewing the filtered job record as follows:
      making an HTTP request, by the client, to a web page associated with the device; and,
      sending a record of filtered jobs from the imaging device, to the web page.

13. The method of claim 1 further comprising:
   merging imaging device communications with the filtered job record.

14. The method of claim 1 further comprising:
   merging client communications with the filtered job record.

15. A system for selectively maintaining a device job history on an imaging device, the system comprising:
   a client having an interface for sending jobs along with a client network address;

an imaging device having an interface to accept jobs, the imaging device printing the jobs for the client; and, a repository residing in the imaging device having an interface to accept a record of the jobs performed by the device, the repository maintaining the job record after the performance of the job, and filtering the job record by matching the client network address to jobs having the same network address to create a filtered history of jobs associated with the client.

16. The system of claim 15 further comprising:

a server having an interface to the client and the imaging device, the server managing jobs sent to the imaging device by the client.

17. The system of claim 15 wherein the imaging device monitors processes selected from the group including the device status, job status, and communications to the device.

18. The system of claim 16 further comprising:

a display having an interface for accessing a viewable copy of the filtered job record.

19. The system of claim 18 wherein the display accesses a viewable copy of the filtered job obtained from a node selected from the group including the client and the server managing the device jobs.

20. The system of claim 19 further comprising:

a web page having an interface to receive the filtered history of job downloads from the repository residing with the imaging device; and, wherein the display accesses a viewable copy of the filtered history of jobs obtained from a node selected from the group including the client, the server managing the device jobs, and the web page.

21. The system of claim 15 further comprising:

a local memory residing with the client having an interface to accept a download of the filtered history of jobs from the imaging device repository.

22. The system of claim 15 wherein the client has a user interface for interrupting a job sent to the imaging device with an action selected from the group including canceling a job, continuing a job, and modifying a job.

23. The system of claim 15 wherein the client sends a network address selected from the group including a network address embedded in transport layer transmission packets and a network address embedded with the job in data layer communications.

24. The system of claim 15 wherein the client sends the client's Internet Protocol (IP) address as the network address.

25. The system of claim 15 further comprising:

a web page having an interface to receive the filtered history of job downloads from the repository residing with the imaging device;

wherein the client makes an HTTP request to the web page associated with the imaging device; and, wherein the repository sends the filtered history of jobs from the imaging device, to the web page for client access.

26. The system of claim 15 the system further comprising:

a local memory residing with the client having an interface to accept a download of the filtered history of jobs from the repository.

27. The system of claim 26 wherein the client collects a record of device communications, and merges the imaging device communications with the filtered history of jobs in the local memory.

28. The system of claim 26 wherein the client collects a record of client communications, and merges the client communications with the filtered history of jobs in the local memory.

29. The system of claim 14 wherein the imaging device is selected from the group including printers, copiers, fax machines, multifunctional peripheral (MFP) devices, scanners, electronic whiteboards, and document servers.

30. The system of claim 29 wherein the imaging device monitors device status, job status, and communications to the device selected from the group including:

the status of job raster image processing (RIP);

the status of jobs queued on the image processing device;

the status of jobs after they have been despooled from a node selected from the group including local and server spoolers;

the status of jobs that have been completed by the imaging device; and, the status of jobs spooled at a node selected from the group including local and server spoolers.

31. The system of claim 30 wherein the client has a user interface for interrupting a job sent to the imaging device with an action selected from the group including canceling a job, continuing a job, and modifying a job.

32. A method for maintaining an imaging device job history on a client, the method comprising:

sending jobs, along with a network address associated with a client sending the jobs, to an imaging device for printing;

making a record of the jobs;

maintaining the job record after the performance of the jobs on the imaging device printing the job;

sending the job record to the client; and, at the client, filtering the job record to retain a history associated with a client by matching the client network address to jobs having the same network address.

33. A system for selectively maintaining an imaging device job history on a client, the system comprising:

a client having an interface for sending jobs along with a client network address;

an imaging device having an interface to accept jobs, the imaging device printing the jobs for the client;

a repository residing in the imaging device having an interface to accept a record of the jobs performed by the imaging device, the repository maintaining the job record after the performance of the job, and sending the job record to the client upon request; and, wherein the client filters the job record by matching the client network address to jobs having the same network address to create filtered history of jobs associated with the client.

* * * * *

UNITED STATES PATENT AND TRADEMARK OFFICE
CERTIFICATE OF CORRECTION

PATENT NO. : 8,405,846 B2
APPLICATION NO. : 10/659513
DATED : March 26, 2013
INVENTOR(S) : Andrew Ferlitsch Page 1 of 1

It is certified that error appears in the above-identified patent and that said Letters Patent is hereby corrected as shown below:

In the Claims:

In claim 29, column 14, line 9, the claim has been incorrectly printed from claim 14. Claim 29 should depend from independent claim 15.

Claim 29 should appear as follows:

29. The system of claim 15 wherein the imaging device is selected from the group including printer, copiers, fax machines, multifunctional peripheral (MFP) devices, scanners, electronic whiteboards, and document servers.

Signed and Sealed this
Fourteenth Day of May, 2013

Teresa Stanek Rea
*Acting Director of the United States Patent and Trademark Office*